June 5, 1962 W. GERSTENBERGER ET AL 3,037,722
GYRO STABILIZER FOR HELICOPTER
Original Filed Aug. 4, 1953 12 Sheets-Sheet 1

INVENTORS
WALTER GERSTENBERGER
H.T. JENSEN
BY
M. B. Tasker
ATTORNEY

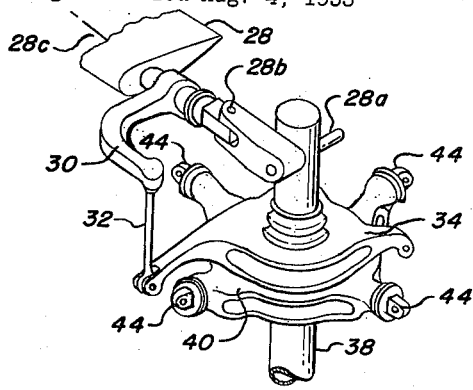
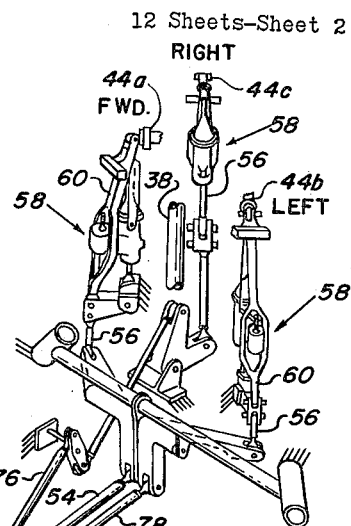
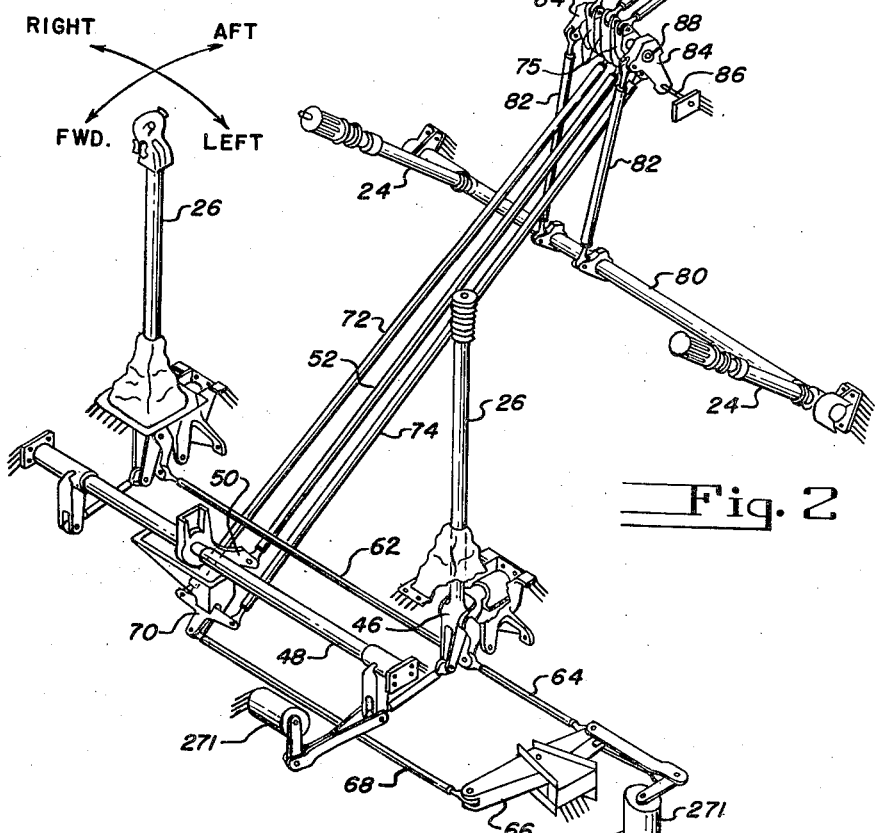

June 5, 1962 W. GERSTENBERGER ET AL 3,037,722
GYRO STABILIZER FOR HELICOPTER
Original Filed Aug. 4, 1953 12 Sheets-Sheet 3
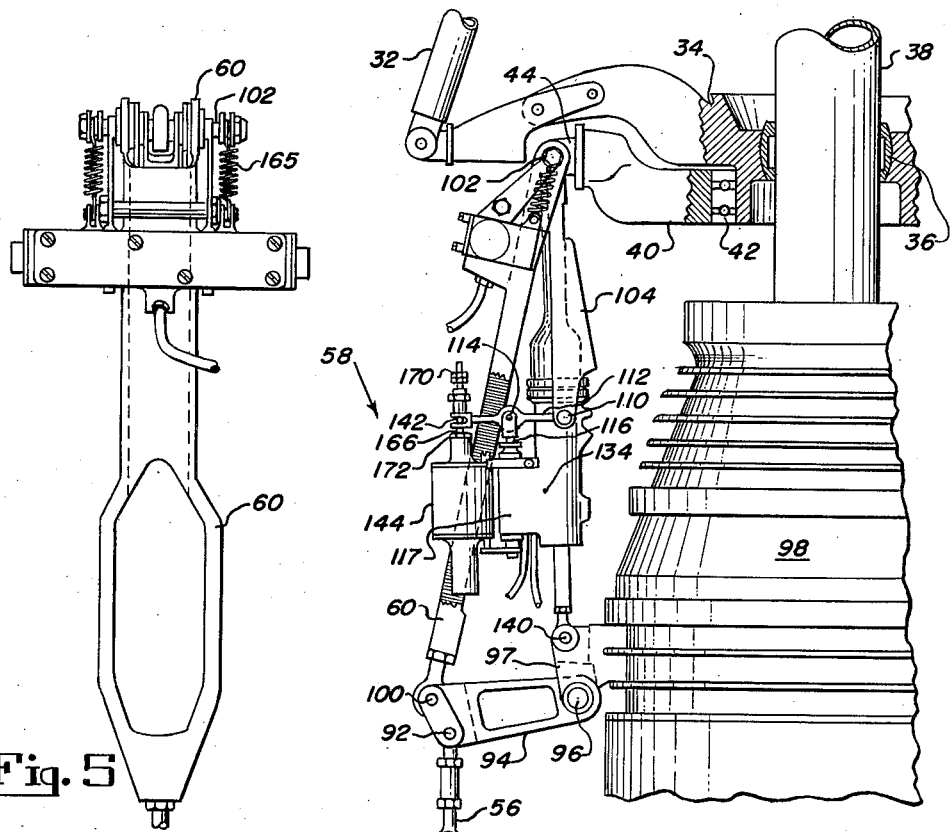
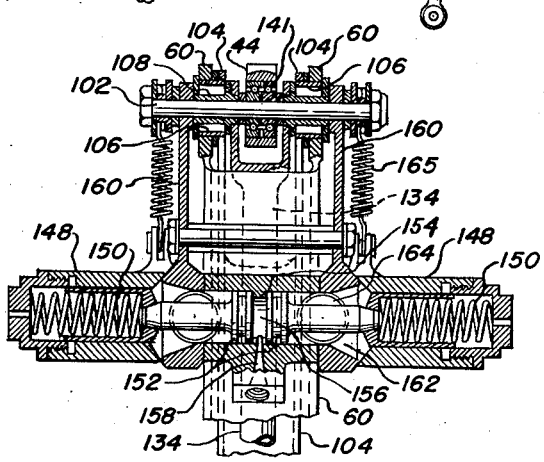
INVENTORS
WALTER GERSTENBERGER
H.T. JENSEN
BY
M. B. Tasker
ATTORNEY

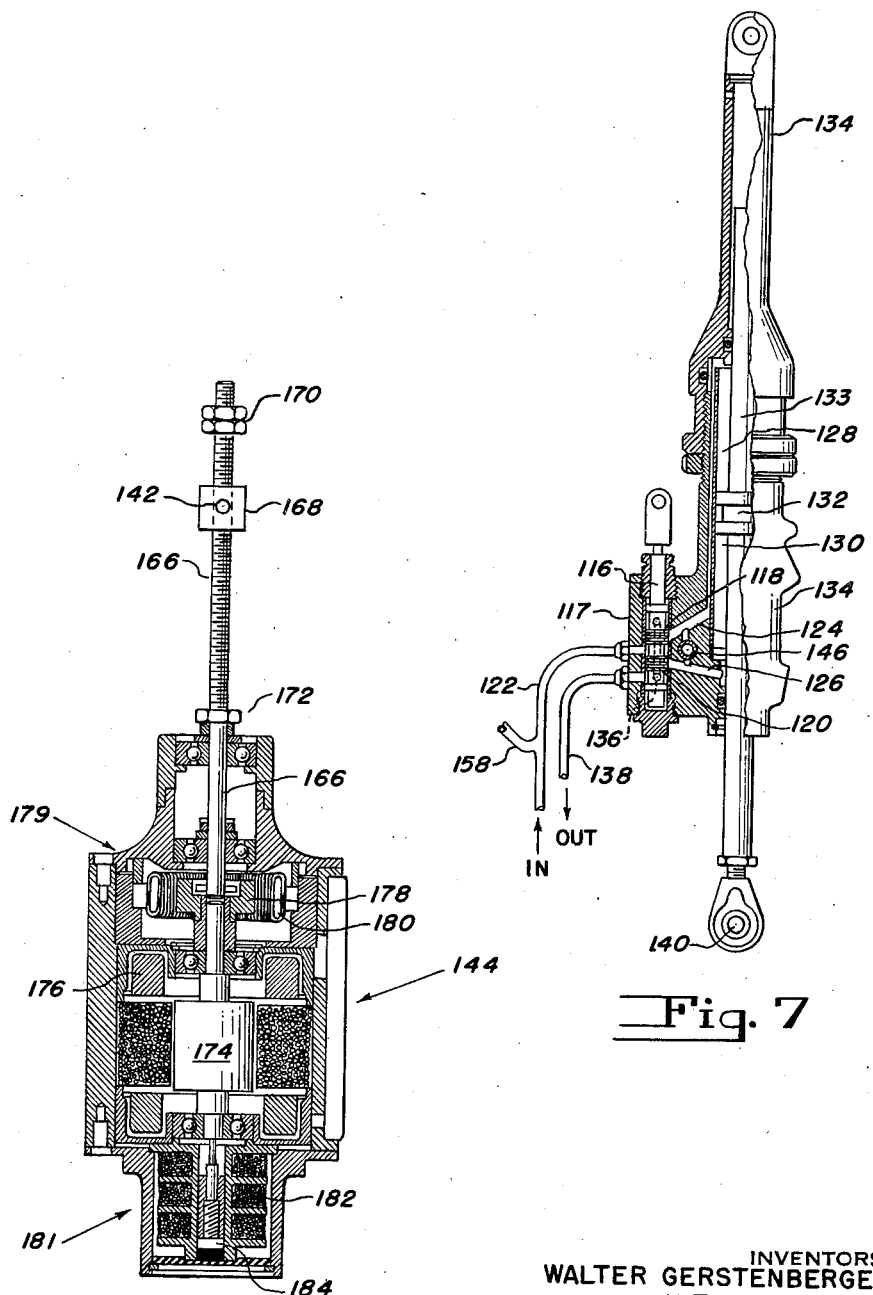

June 5, 1962  W. GERSTENBERGER ET AL  3,037,722
GYRO STABILIZER FOR HELICOPTER
Original Filed Aug. 4, 1953  12 Sheets-Sheet 5
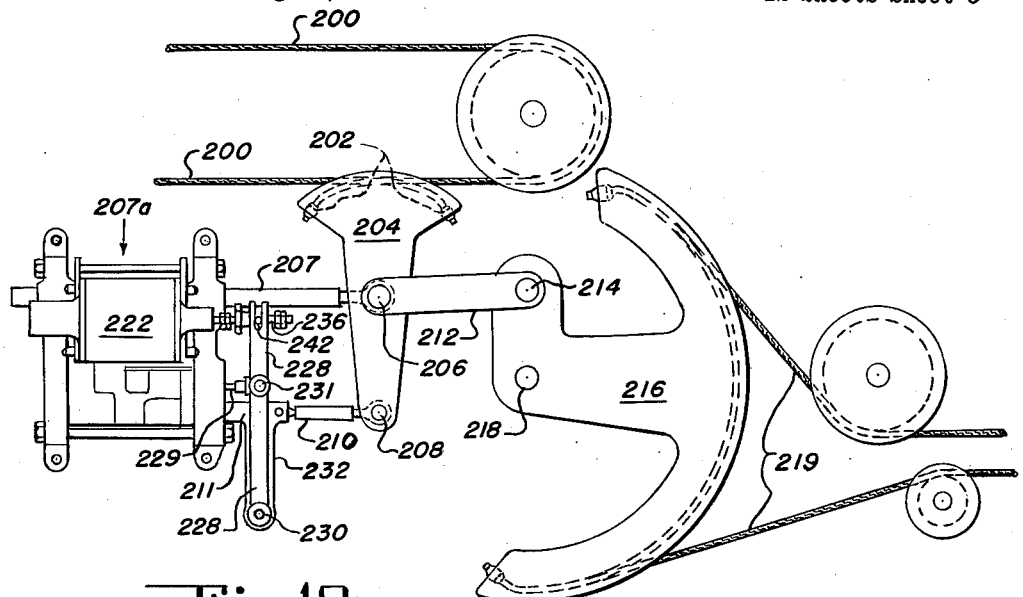
Fig.10
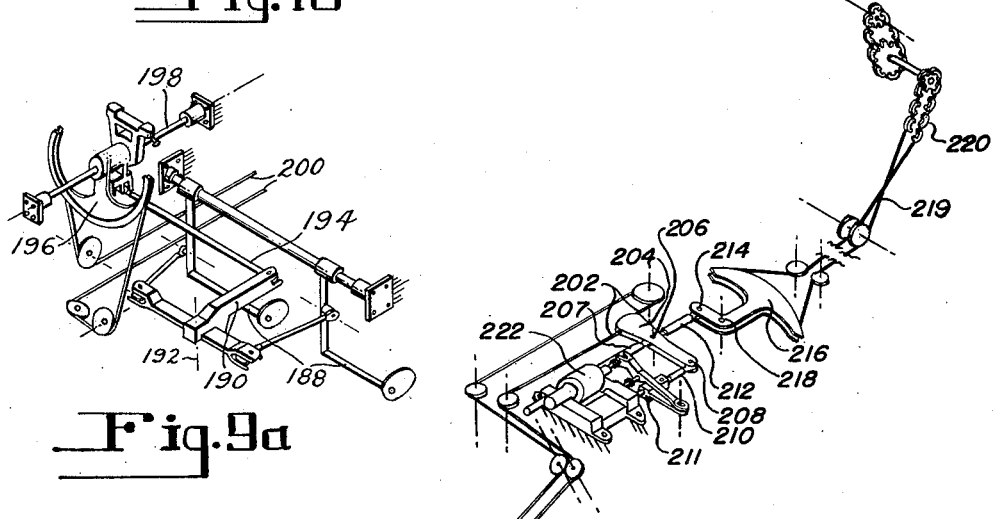
Fig.9a
Fig. 9
INVENTORS
WALTER GERSTENBERGER
H. T. JENSEN
BY
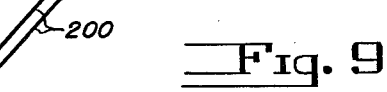
ATTORNEY

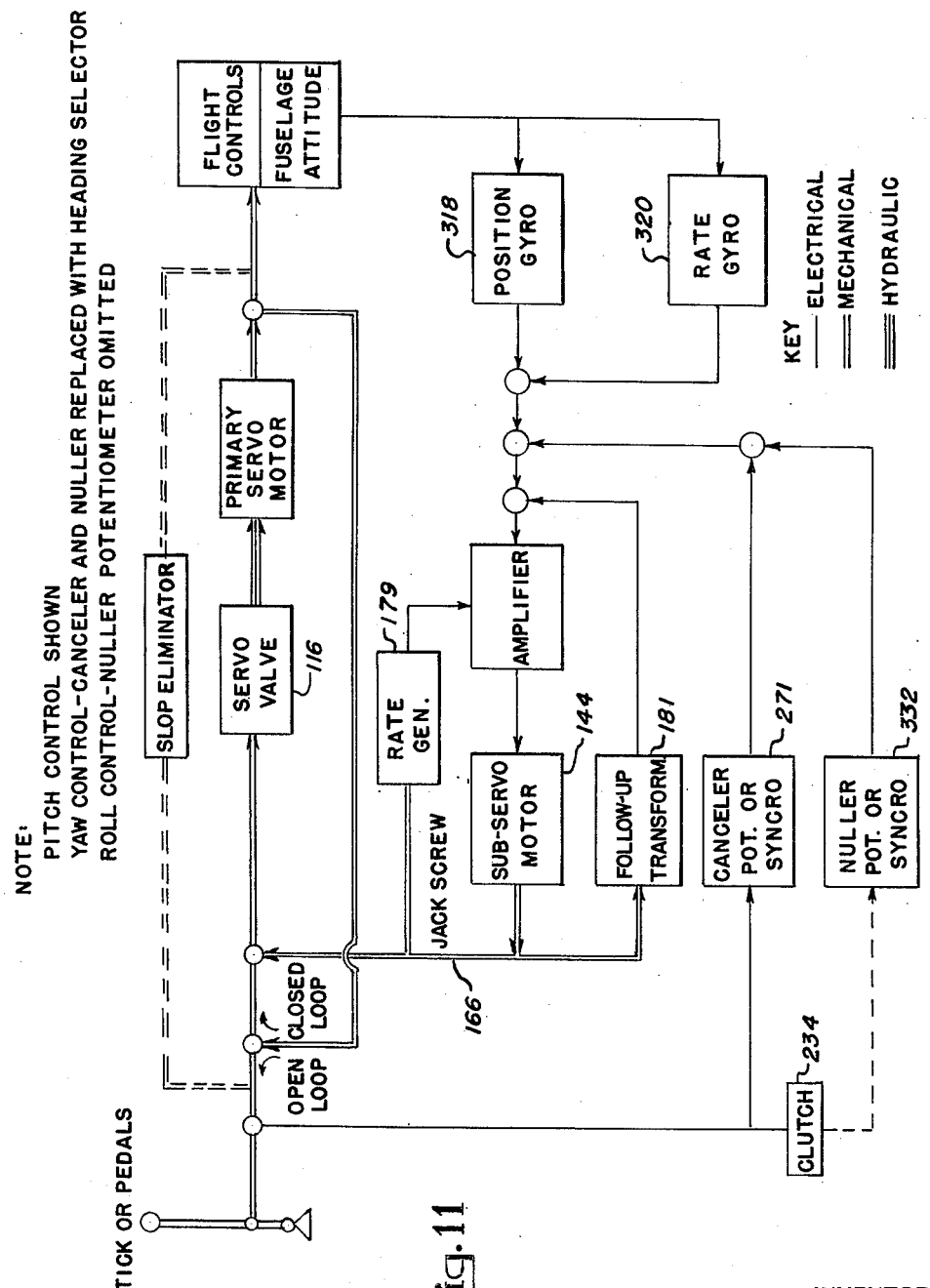

June 5, 1962 W. GERSTENBERGER ET AL 3,037,722
GYRO STABILIZER FOR HELICOPTER
Original Filed Aug. 4, 1953 12 Sheets-Sheet 7

INVENTORS
WALTER GERSTENBERGER
H. T. JENSEN
BY M. B. Tasker
ATTORNEY

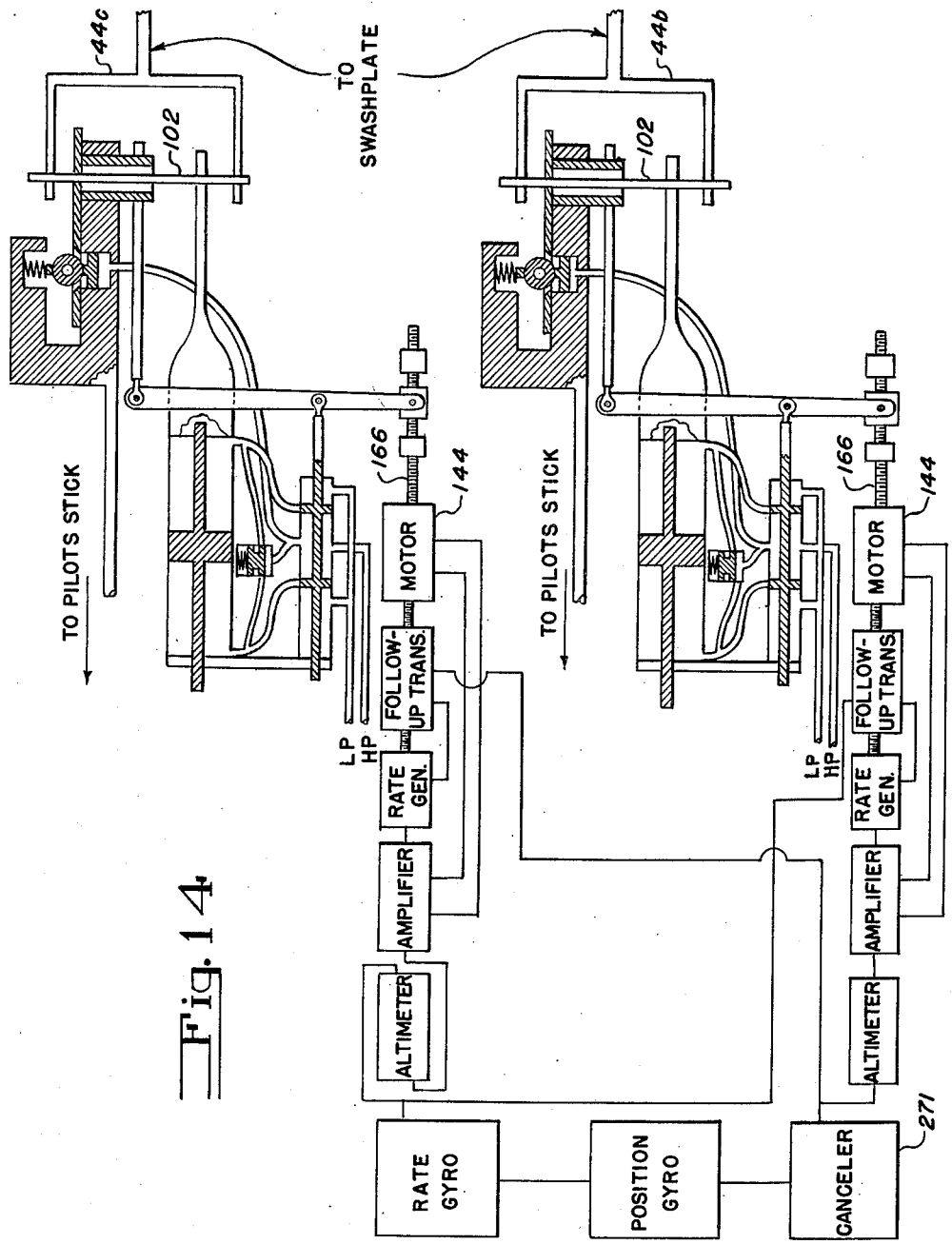

June 5, 1962 W. GERSTENBERGER ET AL 3,037,722
GYRO STABILIZER FOR HELICOPTER
Original Filed Aug. 4, 1953 12 Sheets-Sheet 9
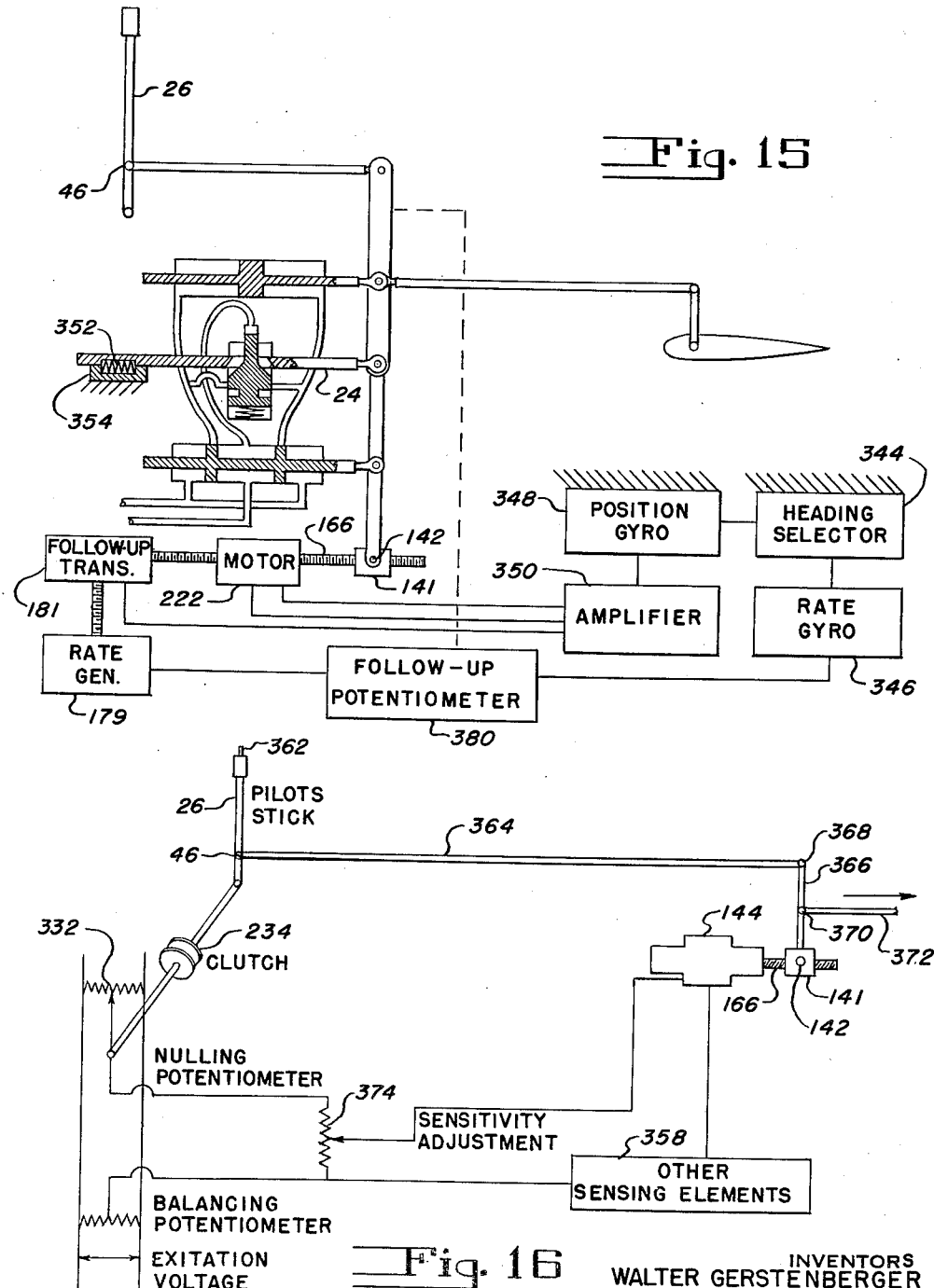
INVENTORS
WALTER GERSTENBERGER
H. T. JENSEN
BY
M. B. Tasker
ATTORNEY

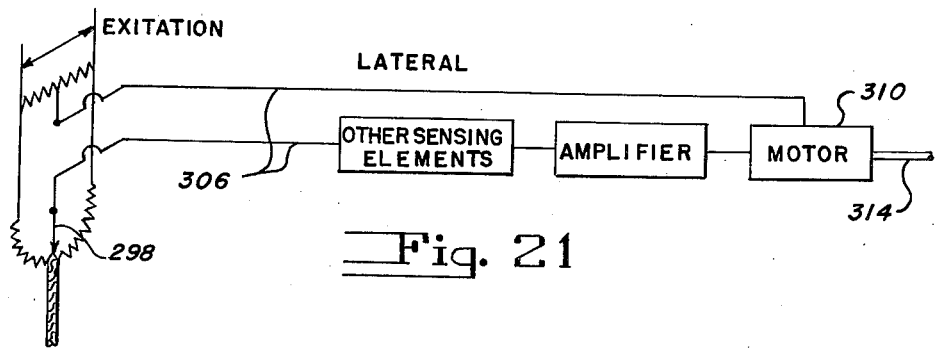
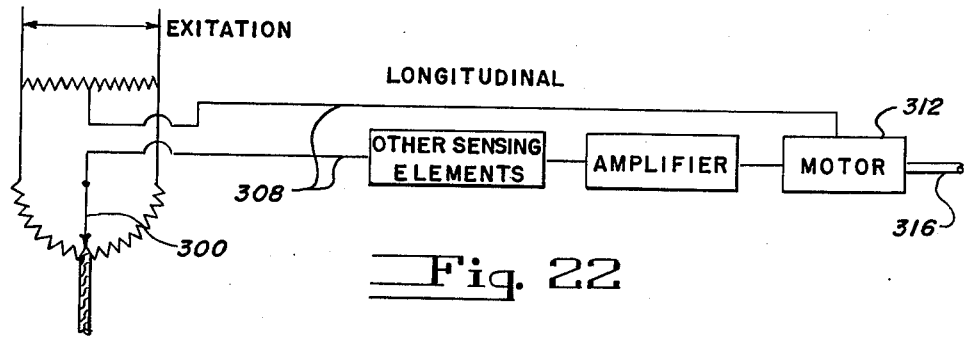
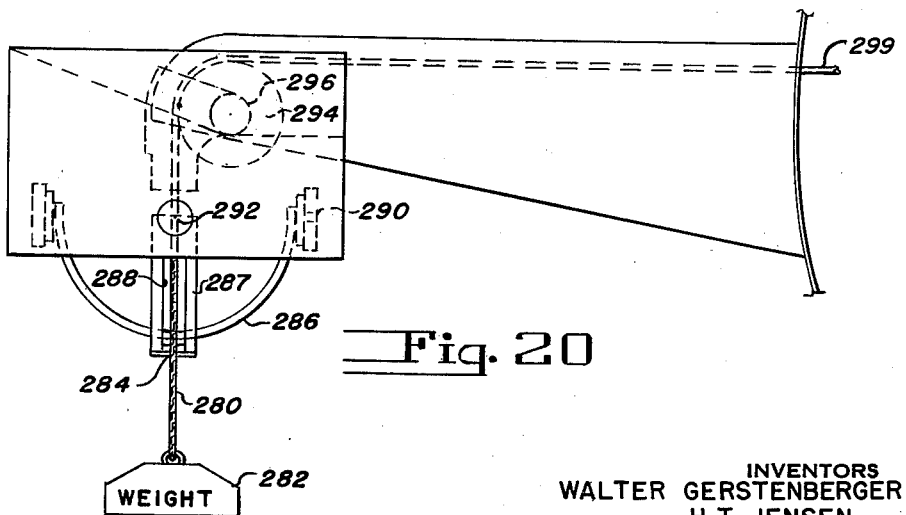

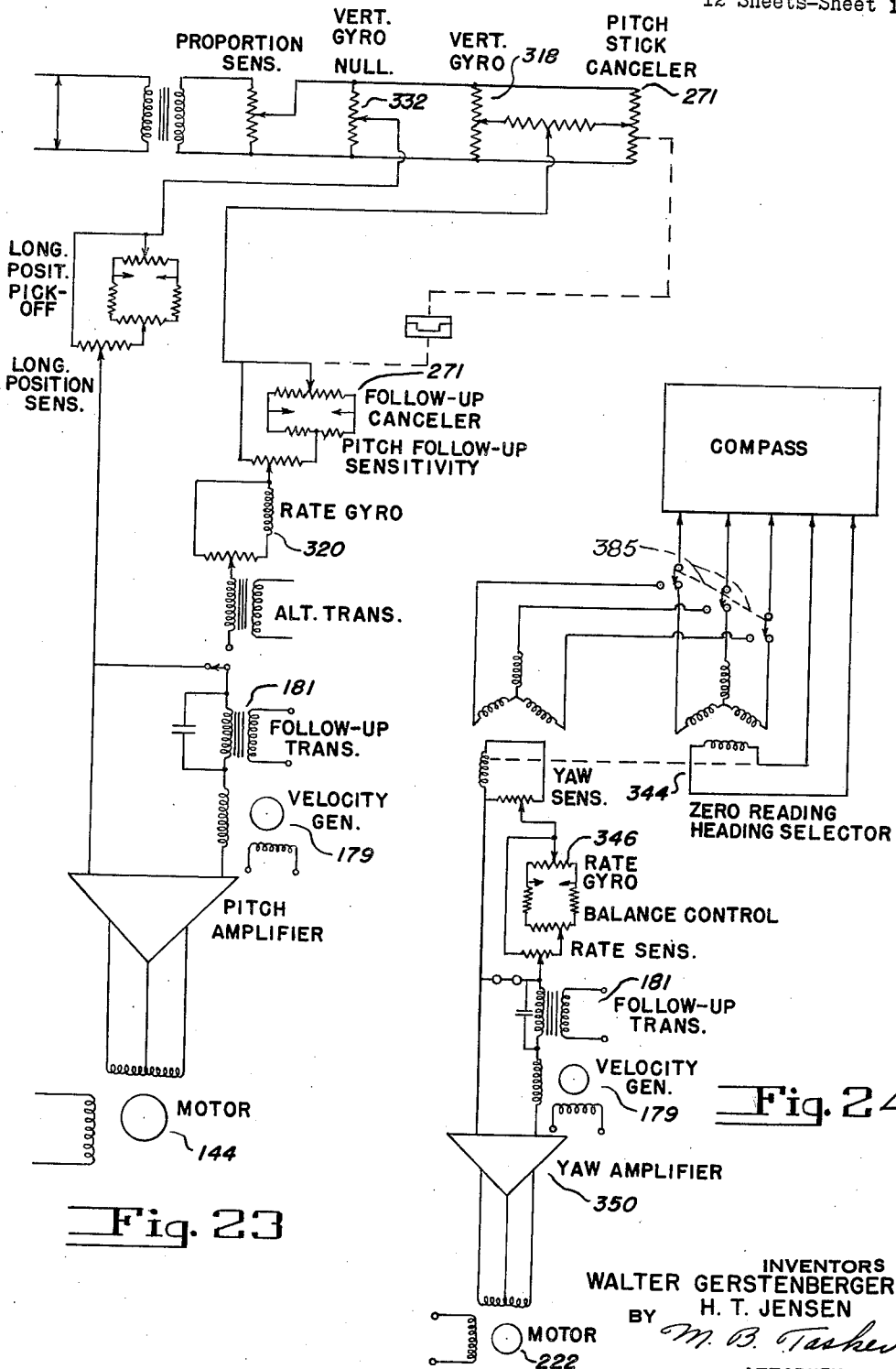

United States Patent Office 3,037,722
Patented June 5, 1962

3,037,722
GYRO STABILIZER FOR HELICOPTER
Walter Gerstenberger and Harry T. Jensen, Milford,
Conn., assignors to United Aircraft Corporation, East
Hartford, Conn., a corporation of Delaware
Continuation of application Ser. No. 372,265, Aug. 4,
1953. This application June 12, 1958, Ser. No. 741,531
32 Claims. (Cl. 244—17.13)

This application is a continuation of our copending application Serial No. 372,265, filed August 4, 1953, now abandoned, and relates to an autopilot for aircraft, such as helicopters or airplanes and has as a general object the provision of an improved autopilot capable of controlling pitch angle, roll angle, and yaw angle as well as the lateral, longitudinal and vertical displacement of the aircraft. While the invention is shown applied to a helicopter, many of the novel features thereof are equally well adapted to autopilot systems for other types of aircraft.

Some of the objects of the invention are to provide an autopilot in which the primary servomotor controls of the aircraft are utilized as actuating members for the autopilot; to provide a differential system which will enable the pilot signal and/or the autopilot signal to contrrol the aircraft without turning off the autopilot; to provide a small electric sub-servomotor in the primary hydraulic control system to produce a differential control correction at the output power level of the sub-servomotor for a stick fixed autopilot system; to provide means to lock out the differential input of the sub-servomotor in the event of a primary hydraulic failure; to utilize means to produce in the same system a combination of differential control correction for small signals and integrated feedback corrections required in the yaw system by opening the feedback loop in a combined electro-hydraulic servo; to insert a voltage into the servo system which is proportional to stick displacement to offset in the differential system the bucking effect of the autopilot when the pilot moves the control stick to achieve a new flight condition; to control the reference level of any of the control movements of the aircraft so that the pilot can engage the autopilot in any flight attitude and have the autopilot hold the ship in that attitude while at the same time enabling the pilot to alter the reference setting to which the craft is slaved without disengaging the autopilot; and to provide an autopilot which is capable of controlling a helicopter to maintain the same fixed in space.

These and other objects and advantages of the invention will become evident from the following detailed description of a preferred embodiment of the invention.

In these drawings:

FIG. 2 is a view showing the pilot's controls for the helicopter of FIG. 1;

FIG. 3 is a diagrammatic view of the rotor head of the helicopter of FIG. 1;

FIG. 4 is an enlarged detail of a portion of the control mechanism of FIG. 2;

FIG. 5 is a detail front view of a portion of FIG. 4;

FIG. 6 is a still further enlarged sectional view of a portion of FIG. 4;

FIG. 7 is a detail view partly in section of one of the primary hydraulic servomotors;

FIG. 8 is a detail sectional view of the rate generator, sub-servomotor and follow-up transformer unit;

FIG. 9 is a schematic showing of the tail rotor pitch control;

FIG. 9a is a detailed view on an enlarged scale of a part of FIG. 9;

FIG. 10 is a view showing the mixing linkage of FIG. 9 in greater detail;

FIG. 11 is a block diagram showing the relationship of the components of the autopilot system;

FIG. 14 is a diagrammatic view of the roll control system;

FIG. 15 is a modified diagrammatic view of a general control system incorporating a pilot feel into the controls;

FIG. 16 is a diagrammatic view showing the nulling system;

FIG. 20 is a side view of the device for controlling hovering over a fixed point;

FIG. 21 is a diagrammatic view illustrating the lateral control for the device of FIG. 20;

FIG. 22 is a diagrammatic view illustrating the longitudinal control for the device of FIG. 20;

FIG. 23 is a wiring diagram of the pitch control system; and

FIG. 24 is a wiring diagram of the yaw control system.

Figure 1:
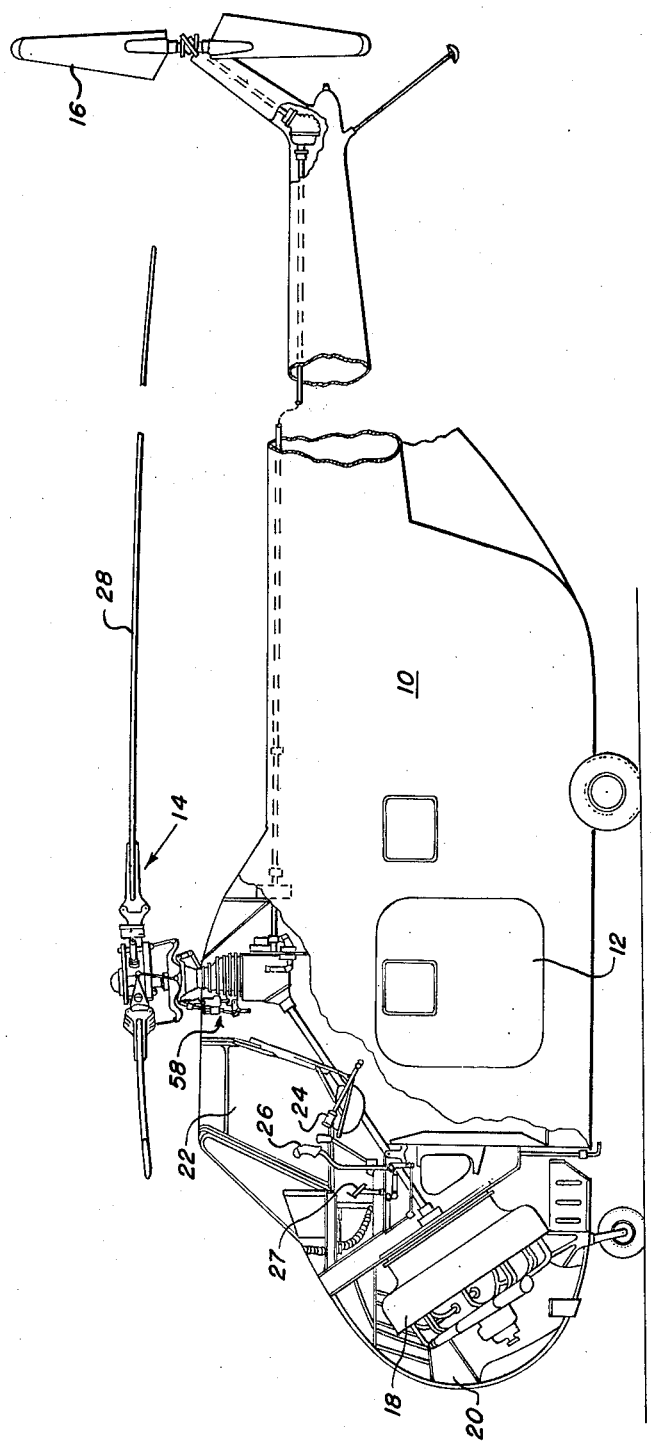
FIG. 1 is a side elevation of a helicopter equipped with the autopilot of this invention.

As herein shown, the helicopter embodying the invention includes an elongated fuselage 10 having a main cargo or passenger compartment 12 directly beneath a main sustaining rotor generally indicated at 14 and having an antitorque tail rotor 16. An engine 18 is provided in a nose compartment 20 and a pilot compartment 22 is provided above the engine compartment in which are located the usual collective pitch control levers 24 and the cyclic pitch control levers 26 for the pilot and copilot. Directional control pedals 27 are connected to control the pitch of the directional control rotor 16 in the usual manner. The blades 28 of the main rotor are of the articulated type which are free to move about flapping hinges 28a and drag hinges 28b (FIG. 3) and to move about their own horizontal axes 28c to vary their pitch in flight. Each blade is provided with the usual blade horn 30 connected by a pitch control rod 32 with the rotating part 34 of the usual swash plate which is universally mounted at 36 (FIG. 4) on an upright drive shaft 38. The non-rotating part 40 of the swash plate is mounted on the part 34 by usual antifriction bearings 42 and is connected to the pilot's controls as will hereinafter be described.

The autopilot of this invention, as illustrated herein, is intended to provide the following controls of a helicopter:

(1) Fuselage pitch angle and rate of fuselage pitch angle change measured by gyroscopic means to correct the longitudinal cyclic pitch.

(2) Fuselage roll angle and rate of fuselage roll angle change measured by gyroscopic means to correct lateral cyclic pitch.

(3) Fuselage azimuth angle and rate of fuselage yaw measured by gyroscopic means to vary tail rotor pitch.

(4) Vertical error sensed by barometric altimeter to correct collective pitch.

(5) Bodily displacement laterally controlled by means for measuring the angular displacement of the fuselage relative to a point on the ground to correct the lateral cyclic pitch.

(6) Bodily displacement longitudinally controlled by means for measuring the angular displacement of the fuselage relative to said point to correct the longitudinal cyclic pitch.

Because of the inherent stability problems associated with a helicopter of this type, it is desired to have an autopilot which can be left engaged during all flight conditions including all maneuvers. Consequently it is advantageous to eliminate the necessity of two means of flight control, i.e. the conventional pilot stick with the autopilot off and the maneuvering stick with the autopilot engaged. The present system enables the pilot to use the conventional flight controls both with and without the autopilot engaged. Fundamentally then, the pilot must be able to overpower the autopilot and this may be done either by (1) off-setting any control correction made by the autopilot (differential control system giving a fixed stick when autopilot alone is controlling helicopter) or (2) overcoming the fixed capabilities of the autopilot (necessitating a free stick when the autopilot is in operation).

The present autopilot is basically of the fixed stick type but certain modifications are required to allow the autopilot to function with limited authority so that the amount of control necessary for the pilot to override the autopilot will not be excessive. In pitch and roll a so-called "canceler" is used which essentially alters the reference fuselage angle when the stick is moved by the pilot. This then makes the cyclic pitch stick essentially a fuselage angle control in the static sense.

In yaw, however, tail rotor pedal angle cannot be and is not made an azimuth angle control in the sense that a steady state pedal position is associated with a compass heading. Consequently other means are required to incorporate the differential system in the directional control. A small range of differential control is allowed, but when steady state errors, arising from large change of rotor torque for instance, demand large tail rotor corrections the autopilot is able to exert a force on the pilot's pedals which if not overcome by the pilot will cause the pedals to move farther, correcting tail rotor blade angle until the fuselage has been driven around to the desired azimuth position. This becomes, with large errors, essentially an integrating feedback.

Considering first the conventional pilot controls for the helicopter it will be noted from FIG. 3 that the non-rotating element 40 of the swash plate has four control bosses 44 equally spaced about its periphery. To three of these the usual controls from the pilot's sticks are pivotally attached, and these control bosses are further identified in FIG. 2 as 44a, 44b and 44c to which the pilot's controls for imparting forward, left and right movements to the ship are attached. The fourth point 44 is connected to a usual scissors (not shown) which connects the swash plate element 40 to fixed structure of the helicopter so that it is free to tilt but cannot rotate.

The dual pilot's controls are shown most clearly in FIG. 2. Movement of either cyclic pitch stick 26 in a fore and aft direction about its universal support 46 will rotate shaft 48 and the arm 50 carried thereby to reciprocate thrust rods 52, 54 and 56, thereby to impart movement to the swash plate at boss 44a through the combined hydraulic and electrical servomotor unit 58 or through the manual link 60 alone, as described below. Lateral movement of sticks 26 are effected in unison by a tie rod 62. A rod 64 connects rod 62 to a rocking lever 66 and through a thrust rod 68 connects the sticks to a double bellcrank 70 which has its opposite arms connected to thrust rods 72 and 74 so that the latter are differentially operated upon lateral movements of the sticks. The reciprocatory movements of rods 72 and 74 are transmitted through suitable bellcranks 75 and rods 76 and 78 to rods 56 and links 60 associated with the units 58 and to bosses 44c and 44b which provide for lateral tilting of the tip path plane of the rotor blades.

Rotation of rod 80 by the collective pitch sticks 24 exerts a thrust on the two rods 82 which effects movement of a pair of bellcranks 84 about their fixed pivots 86 to raise and lower a shaft 88 on which the three bellcranks 75 of the cyclic pitch linkage are pivotally carried. This imparts an equal thrust to the rods 76, 54 and 78 which in turn imparts an equal thrust to the rods 56 and through links 60 to all three bosses 44a, 44b and 44c on the relatively stationary swash plate 40.

One of the three electro hydraulic servomotor units 58 is shown in FIGS. 4 to 6. It will be noted in FIG. 4 that each of the rods 56 is pivoted at 92 to one end of a link 94 the other end of which is pivoted at 96 to a bracket 97 carried by a pylon 98 of the helicopter. Link 60 is also pivoted at its lower end to link 94 at 100. At its upper end link 60 is pivoted to the boss 44 by a pin 102 with a lost motion connection which is shown most clearly in FIG. 6. Here it will be seen that link 60 and a link 104, the bifurcated upper ends of which lie adjacent, have enlarged apertures in their upper ends in which short bushings 106 are fitted to receive loosely a bushing 108 which is a close fit on the pin 102. The link 104 which with link 60 has the lost motion connection relative to pin 102 also has a pivotal connection 110 at its lower end with a lever 112 which is pivoted intermediate its ends at a point 114 to a pilot valve 116 reciprocable in valve casing 117 carried by the hydraulic servomotor. This pilot valve (FIG. 7) has upper and lower lands 118 and 120 which meter fluid under pressure entering at 122 selectively to passages 124 and 126 which communicate with the chambers 128 and 130 above and below a power piston 132. Piston 132 is mounted on a piston rod 133 in a cooperating cylinder 134. The usual internal passages including the axial passage 136 in the pilot valve 116 are provided, by which fluid on the low pressure side of the piston 132 is allowed to vent through a duct 138. The lower end of piston rod 133 is pivoted at 140 to bracket 97. The cylinder 134 is pivoted at its upper bifurcated end on bushings 108 and hence on pin 102 as shown in FIG. 6. The inner race of a ball bearing 141 is mounted on pin 102 between the furcations at the upper end of cylinder 134. Its outer race is carried by a boss 44 of the relatively stationary part 40 of the swash plate.

From the above it will be evident that movement of the pilot's controls to move any one of the rods 56 results in an initial movement of links 60 and 104 without moving the swash plate due to the so-called "sloppy connection" of these links with pin 102 afforded by the enlarged bushing 106. The effect of this initial movement is to rock lever 112 about its left hand end (FIG. 4) where it is pivoted at 142 on a sub-servomotor unit 144, hereinafter described. This movement of 112 moves valve 116 to admit fluid under pressure to the power servomotor and causes the cylinder 134 to move the lug 44 and the swash plate. It will be evident that if rod 56 is moved up lever 112 will move counterclockwise about 142 and fluid will be admitted to cylinder 134 by the pilot valve above the piston 132. Cylinder 134 will be moved upward and in so doing will carry the pilot valve casing 117 with it, since the pilot valve casing is integral with cylinder 134, thus providing a follow-up for the movement of the pilot valve originated by the control stick.

Figure 13:
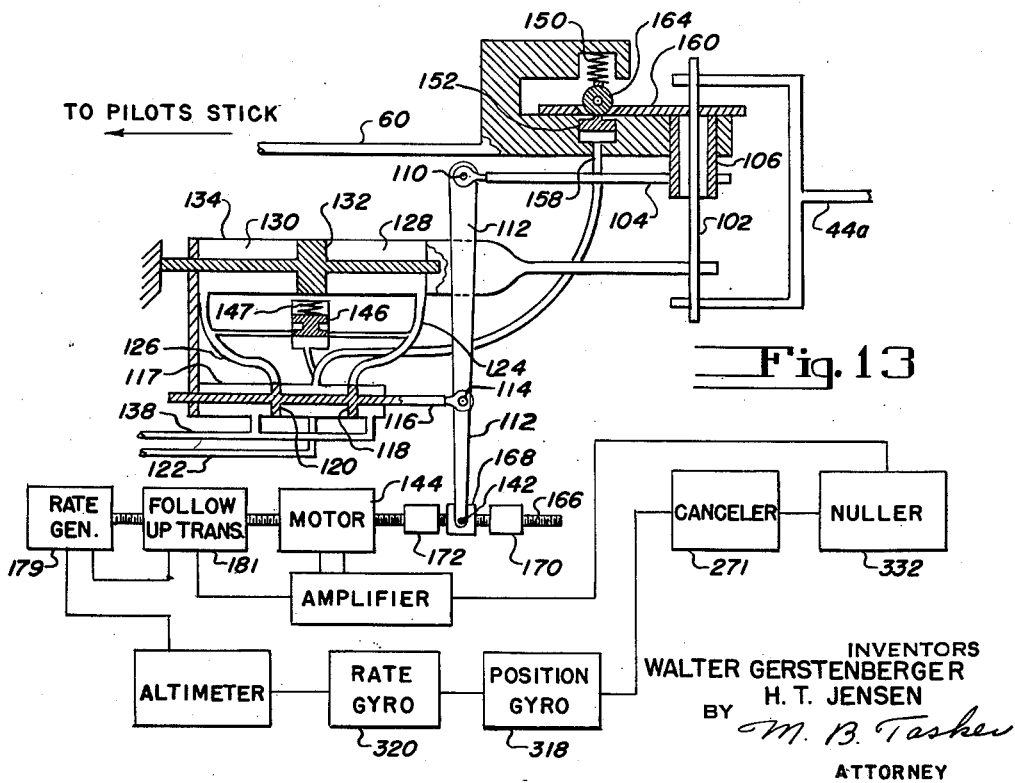
FIG. 13 is a diagrammatic view of the pitch control system.

As shown in FIG. 7, communication between passages 124 and 126 is provided for by a valve 146. This valve, shown schematically in FIG. 13, is kept closed by pressure of the hydraulic system which compresses a spring 147. This valve when opened by failure of the pressure automatically establishes free communication between the chambers on opposite sides of the primary power piston 132.

Automatic means is likewise provided for simultaneously eliminating the lost motion above described between bushings 106 and 108 whenever the pressure in the hydraulic system fails. This mechanism which is conveniently termed a "slop eliminator" is illustrated most clearly in FIG. 6 and includes a pair of diametrically opposed cylinders 148, closed at their remote ends, and carried by link 60. These cylinders house a pair of compression springs 150 which bear against the closed ends of the cylinders and against piston elements 152. The confronting piston heads under the action of the springs normally abut the annular stop 154 and provide a common chamber 156 into which hydraulic fluid under pressure is introduced from the hydraulic system through passage 158. Passage 158 may communicate with the high pressure side of the hydraulic system wherever convenient, for example, as here shown, with fluid conduit 122 (FIG. 7). Pin 102 has pivotally mounted thereon a pair of depending links 160 which are vertically slidable through cylinders 148 and which have outwardly flared passages 162 at their lower ends aligned with the bores in cylinders 148. The piston elements 152 are provided with cam rollers 164 which are reciprocable with the pistons in passages 162 under the action of fluid introduced into chamber 156. The rollers are a close fit in the smaller diameter of passages 162. In the position of the parts shown in FIG. 6 the slop in the linkage provided by bushings 106 and 108 is eliminated by the presence of cams 164 which are closely received in the smaller diameters of flared passages 162 and act directly against links 160 to transmit any motion of links 60 to pin 102 without lost motion. When, however, the pistons are forced apart by the fluid in chamber 156 the cams 164 are located in the flared portion of passages 162 and the link 60 can move relative to the pin 102, i.e. the "slop eliminator" is inoperative. Tension springs 165 connect pin 102 with the two cylinders 148 and serve to support the weight of these cylinders and link 60.

Electric sub-servomotor 144 is mounted directly on the casing of the pilot valve, as shown in FIG. 4, and has its rotatable shaft in the form of a jack screw 166 located alongside the pilot valve piston 116. The jack screw has a traveling nut 168, as shown in FIG. 8, threaded thereon carrying the pivot 142 which is in the form of a trunnion pin received in the bifurcated free end of lever 112. Thus as the jack screw is rotated in one direction or the other the pin 142 moves up and down and moves the lever 112 about pivot 110 at its right-hand end to move the pilot valve 116. As shown, upper and lower adjustable stops 170 and 172 are provided on the jack shaft in the form of threaded nuts which limit the movement of lever 112 by the electric sub-servomotor. It will be evident in FIG. 4 that the lever 112 is a differential lever connected at its midpoint to the pilot valve and at its opposite ends to link 104 and jack screws 166. As a result, movement of the pilot valve piston 116 can occur either as a result of movement imparted to link 104 by the pilot or movement imparted to jack screw 166 or a simultaneous movement of both the link and the jack screw.

The sub-servomotor unit 144 as shown in detail in FIG. 8 includes an armature 174 fixed on jack screw 166 and fields 176. Also on the jack screw 166 is the armature 178 of a rate generator 179 having fields 180. The rotation of the jack screw by armature 174 generates a bucking voltage in the rate generator to damp the movement of the sub-servomotor. Also in the same casing with the sub-servomotor and coaxial therewith is a follow-up transformer 181 having windings 182 and a core 184 which is threaded onto the lower extended end of jack screw 166 so that as the armature 174 rotates the core 184 is moved up or down to vary the voltage output of the transformer. The operation of the control system thus far described will be explained in detail hereinafter.

Figure 12:
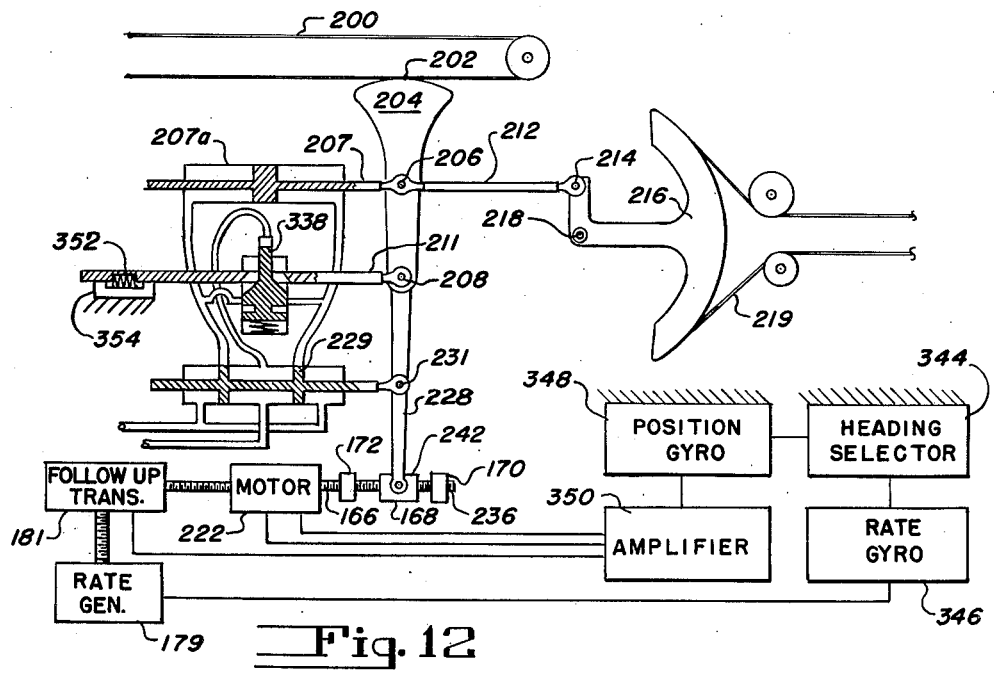
FIG. 12 is a diagrammatic view of the yaw control system.

The tail rotor pitch control is shown in FIGS. 9, 9a and 10 wherein the pilot's and copilot's rudder pedals are shown at 186 and 188. Differential movement of either set of pedals results in swinging of a double bellcrank 190 about a fixed vertical pivot 192 to in turn reciprocate a rod 194. Rod 194 is attached to a projecting arm 197 which forms a part of and rotates a cable segment 196 about rod 198 upon which segment 196 is supported and is freely rotatable to operate opposed reaches of cable 200 the ends of which are connected at 202 to a lever 204. Lever 204 is pivoted intermediate its ends at 206 to a piston rod 207 of a primary hydraulic servomotor 207a and at 208 to a rod 210 which is pivotally connected to the sloppy link 211 (FIG. 12). A link 212 is pivoted to the power piston at 206 and is pivoted at 214 to a cable sector 216 movable about a fixed pivot 218. Sector 216 drives the usual cables 219 and connected chain 220 for actuating the blade pitch control mechanism (not shown) on the tail rotor. An electric sub-servomotor 222 is provided, similar to the motor 144 above described for the main rotor pitch control, having a threaded jack screw 236 which oscillates a lever 228 about a pivot 230 at the end of a depending arm 232 on the sloppy link 211. A pilot valve 229 is pivoted to lever 228 intermediate its ends at 231 for controlling admission of fluid to the primary servomotor 207a.

In addition to the structure above described, a stick canceler 271 is provided installed as shown in FIG. 2, in order to offset in the differential system, used in pitch and roll control, the bucking effect of the autopilot when the pilot moves the control stick to achieve a new flight condition. The stick canceler provides a voltage proportional to stick displacement which is inserted into the servo system input and which offsets the bucking voltage generated by the effected gyro as a result of the corresponding fuselage attitude change. The stick canceler is shown diagrammatically in FIG. 17. Here it will be noted that movement of the stick 26 to effect movement of the swash plate also operates the canceler potentiometer 271 through torque shaft 272 and a connecting link 274 to create a voltage proportional to the displacement of the stick. This voltage is inserted in the servo system input through wires 276 to offset the bucking voltage generated by the sensing elements which is applied at 278 as a result of fuselage attitude change caused by the movement of the stick by the pilot. The operation of this canceler is shown diagrammatically in FIGS. 18 and 19. In a steady state of hovering, the gyros do not create a voltage and the stick is nearly vertical. When the pilot desires to fly forward, for example, the stick must be pushed forward. This would cause the ship to nose down and a corresponding voltage would be generated by the gyros. As the stick moves forward, however, a potentiometer is unbalanced in proportion to the stick displacement. The voltage created by this unbalanced potentiometer is equal and opposite to that voltage created by the gyro, and hence, no error signal is received at the sub-servomotor. Thus, the pilot may change the flight attitude of the ship without having to buck the voltage created by that change in attitude.

It is also necessary to provide some means for controlling the reference level of any of the controlled degrees of freedom. First, it must be possible for the pilot to engage the autopilot in any flight attitude and have the autopilot hold that condition. Second, it is also desired that the pilot be able to alter the reference setting to which the helicopter is slaved without disengaging the autopilot. In the pitch and roll systems which are straight differential systems, any change in reference setting can be accomplished by simple manipulation of the stick. However, in the yaw system where the pilot's pedals cannot have a steady state relationship to azimuth angle, some additional means of changing the reference is required. To null pitch and roll reference signals, electric means for driving the autopilot to null the motion of the azimuth stick are used so arranged that the helicopter flight attitude is undisturbed in the procedure. These means include an additional nulling potentiometer in the system which is capable of generating a voltage to offset any possible combination of steady state voltages introduced by the sum of the sensing elements as described more in detail hereinafter. An automatic self-tracking system is used in the yaw system in which the autopilot automatically nulls itself before engagement, and also nulls itself any time the pilot overrides the force exerted during open loop operation. Included in this structure is a panel instrument known as a heading selector by which the pilot may manually alter the autopilot azimuth setting when the autopilot is engaged. The direction or heading selector can be clutched to a gyro compass. When the automatic pilot is in operation any deviation between the two will generate a corrective voltage in the control circuit to actuate the servomotor. Prior to engagement of the autopilot the units are clutched together so that upon engagement there would be no error signal and the helicopter will hold the direction of that instant. The units are declutched upon engagement of the autopilot, and to fly in any direction the pilot may move the direction selector to generate a corrective voltage until the compass is realigned with the selector.

The autopilot system also includes means for enabling the ship to hover over a fixed point or to minimize drift when hovering over water. This structure is shown in FIGS. 20, 21 and 22 and consists of a line 280 with a weight 282 attached which is dropped either in the water or on land. This line passes through an aperture 284 formed by the intersecting slots in two right angularly disposed bales 286 and 287 each of which has a slot 288. The bales are pivotally supported at their ends in a common horizontal plane on pivots 290 and 292, the axes of which are at right angles to each other. The line 280 passes upward over a pulley 294 pivoted at 296 and is secured to the fuselage at 299. It will be evident that any movement of the ship either lateral or longitudinal will cause swinging of bales 287 and 286, respectively. The bales are operatively connected to the movable elements 298 and 300 of laterally and longitudinally responsive potentiometers which, as shown in FIGS. 21 and 22, vary the voltage in wires 306 and 308 which supply the sub-servomotors of the pitch and roll control systems.

Before considering the operation of the autopilot system in detail, it will be helpful to consider the block diagram shown in FIG. 11 which shows the relationship of the system components in the pitch control system by which the ship may be controlled by the autopilot or the pilot in any desired combination. In general the basic autopilot system shown in FIG. 11 for pitch control comprises a position gyro 318, a rate gyro 320 and a follow-up transformer 181. The two gyros contribute a signal voltage which drives sub-servomotor 144. This motor drives a rate generator 179 and the follow-up transformer 181 until the latter contributes a voltage which alone offsets the signal voltage. The sub-servomotor 144 through its jack screw 166 positions the hydraulic servo, or pilot valve, 116. The pilot valve controls the primary servomotor which is connected to the pitch changing mechanism of the rotor head. Also shown in FIG. 11 is the arrangement of the nuller potentiometer, or synchro, 332 controlled by clutch 234 conveniently controlled from the pilot stick, and the canceler potentiometer, or synchro, 271. It will be understood that in yaw control the canceler and nuller will be replaced with a heading selector, while in roll control the nuller potentiometer will be omitted.

The system can be operated in three ways (1) hydraulic power off, autopilot off. When the hydraulic power is off the automatic slop eliminator is operative giving a definite pivot point so that the train of command is through the mechanical linkage only from the pilot's stick, (2) hydraulic power on, autopilot off. In this operation the slop eliminator is released and normal servo operation from the stick takes place. The train of command comes through the linkage from the pilot's stick to actuate the pilot valve, the primary hydraulic servomotor and hence the pitch changing mechanism, (3) hydraulic power on, autopilot on. Here the slop eliminator is held released, excitation comes from voltage from the gyros to the sub-servomotor which drives the jack screw and opens the pilot valve bringing the primary servomotor into action. At the same time a voltage is being created in the follow-up transformer which when equal and opposite to the gyro signal will cause the motor to cease turning, allowing the travel of the primary servomotor to close the pilot valve in the usual follow-up operation.

In describing the operation of the autopilot system reference is made first to the diagrammatic showing of the pitch control mechanism in FIG. 13, and to FIGS. 2–6 which have previously been described, showing the corresponding mechanism.

As previously stated, there are three ways in which the system can be operated, (1) with the hydraulic power off and the autopilot off, movement of the pilot's stick 26 forward (FIG. 2) results in a downward movement of link 56 associated with the left-hand servomotor unit 58 resulting in downward movement of the link 60 associated with that unit. Since there is no pressure in chamber 158 of the slop eliminator, the rollers 164 occupy the position shown in FIG. 6 and the piston 146 (FIG. 13) is in a lowered position in which the passages 124 and 126 are connected to provide free fluid communication between the chambers 128 and 130 on opposite sides of the primary servomotor piston 132. Under these conditions movement of link 60 is conveyed without lost motion through the links 160 directly to pin 102 and boss 44a on the relatively stationary swash plate portion 40. This direct manual movement of the swash plate by the pilot stick is permitted because the servomotor cylinder 134 is free to move relative to piston 132 by reason of the free communication established by valve 146 above described. During this manual movement of the swash plate, the lever 112 is free to pivot about its pin 142 on the jack shaft 166.

(2) If the hydraulic power is on and the autopilot off, the slop eliminator will be released, i.e. the cam rollers 164 will be moved outwardly in FIG. 6 due to the presence of hydraulic fluid in chamber 156. With these cam rollers in the flared ends of passages 162 the link 60 which carries the pistons 152 and the rollers 164 of the slop eliminator are free to move through the space afforded between bushings 106 and 108 and to carry with it during this lost motion movement, the depending link 104. This movement is sufficient to enable link 104 to move lever 112 about its end pivoted at 142 to move the piston 116 of the pilot valve to the left, for example, in FIG. 13 thus admitting hydraulic fluid under pressure in pipe 122 into passage 126 and chamber 130 resulting in movement to the left of the cylinder 134 of the power servomotor which is directly pivoted on pin 102. Movement of cylinder 134 provides the usual follow-up for pilot valve 116. It will thus be evident that with the hydraulic power on and the autopilot off a normal servomotor operation from the pilot's stick takes place, (3) with the hydraulic power on and the autopilot on, the slop eliminator is held released. The manual servo operation described in (2) above is still possible. In addition, the sub-servomotor 144 is energized by voltage from the position gyro 318 as modified by the rate gyro 320 or from the other signal elements to correct any deviation from level flight. For instance, if the ship should for some reason start to nose down, a voltage is supplied to the sub-servomotor 144 to rotate it in a direction to cause the traveling nut 168 on the jack screw 166 to travel to the right in FIG. 13. Since lever 112 is pivoted at 110 to link 104 which is at the moment stationary, the piston 116 of the pilot valve will move to the right in FIG. 13 to admit hydraulic fluid through passage 124 to chamber 128. This will cause the main servomotor cylinder 134 to move upwardly (FIG. 4) and to the right as viewed in FIG. 13 to raise boss 44a and correspondingly tilt the swash plate to bring the ship back to level flight. During this operation of the motor 144 the lower threaded end of jack screw 166 has rotated a corresponding amount to move the core 184 (FIG. 8) threaded thereon sufficient to generate a bucking voltage in the transformer which, as the ship returns to level flight, will equal the voltage supplied to the motor 144. Since the voltage supplied by the follow-up transformer 181 opposes the voltage from the position gyro which was supplied to the sub-servomotor 144, the latter will cease to rotate when it has instituted a correction of the down-nose tendency of the ship. Associated with the follow-up transformer 144 is a rate generator 179 which has a damping effect on the movements of the jack screw for the purpose of preventing overtravel of the sub-servomotor.

Figure 18:
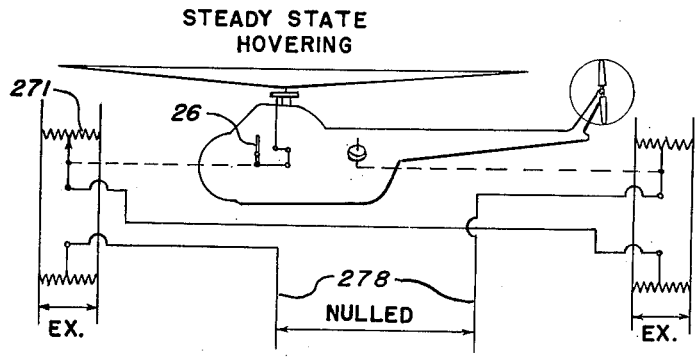
FIG. 18 is a diagrammatic view illustrating the stick canceler in hovering.
Figure 19:
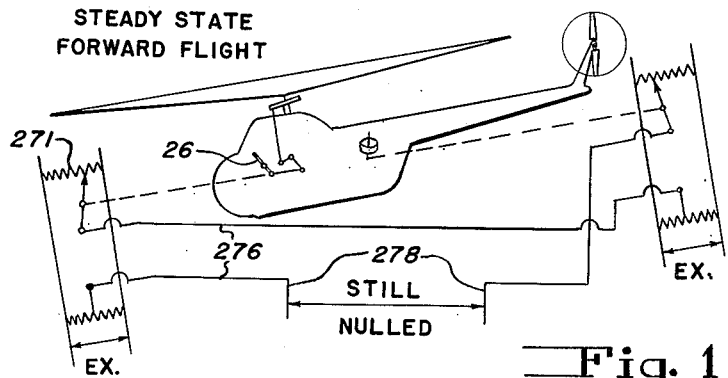
FIG. 19 is a diagrammatic view illustrating the stick canceler in forward flight.

Also involved in the pitch control mechanism is a canceler 271 and a nuller 332. The stick canceler described above is shown diagrammatically in FIG. 17 and its action is shown in FIGS. 18 and 19 which will be described hereinafter.

In the yaw control mechanism shown diagrammatically in FIG. 12, additional means are required to incorporate the differential system which will now be described. With hydraulic power on and the autopilot off the slop eliminator piston 338 is held down by hydraulic pressure. Movement of the pilot's stick rotates quadrant 204 about pivot 206 moving point 208. This movement is allowed by the slop eliminator 211. As point 242 is fixed, point 231 will be forced to move, cracking the pilot valve 229. This will release pressure to the primary servomotor 207a moving point 206 and also quadrant 216 about point 218 to change the tail rotor pitch. Since point 206 moves and the cables 200 are stationary, point 208 will reverse its direction, moving point 231 and shutting off the pilot valve 229.

Meanwhile, the heading selector 344 which contains a synchromotor slaved to the gyro compass has been keeping track of the ship's heading. When the autopilot is turned on the heading selector is locked to the trim knob and the ship is slaved to the compass. Thus any deviation from the heading selector course creates an error signal from the rate and position gyros 346 and 348 which is amplified by the amplifier 350 and drives the electric sub-servomotor 222 which is identical with sub-servomotor 144 described in connection with the pitch control system.

As this motor turns, an opposing voltage is generated in the follow-up transformer 181. This voltage will eventually equal the voltage from the gyros 346 and 348 and will eventually cause the motor 222 to stop. Thus for a given gyro voltage, the motor will make only a certain number of turns. The motor 222 drives the jack screw 166 which rotates arm 228 about pivot point 208. This opens the pilot valve 229 permitting high pressure fluid to act against power piston 207. This piston moves sector 204 about fixed point 202, moving point 208 so that arm 228 assumes a position such that point 231 returns to neutral and the pilot valve 229 closes. The slop eliminator 338 is so constructed that for a relatively small heading error the travel of the jack screw 166 will be less than the free travel in the slop eliminator. Consequently, no feedback signal enters the pilot's controls and the system is in "closed loop."

However, in the case of a relatively large heading error, the following operation takes place: the jack screw 166 will move point 242 carried by nut 168 and drive arm 228 about point 208 opening the pilot valve 229 as before. High pressure fluid will move piston 207 and change the tail rotor pitch. Built into the slop eliminator plate 211 is a spring 352 mounted between abutments in the plate. Plate 211 reciprocates spring 352 in a plate having a notch 354 the opposite abutments of which are normally spaced from the ends of spring 352. As piston 207 moves, sector 204 will rotate about point 202 until the free movement between spring 352 and its abutments is used up. The large signal turns the motor 222 beyond the range corresponding to unrestricted movement of member 211. The pilot valve 340 will still be open and piston 207 will continue to move. Consequently when plate 211 has moved sufficiently to bring spring 352 into engagement with one or the other of the abutments of notch 354, point 208 instead of being restrained begins to compress the spring 352 upon which it is bearing. Point 202 and the pedals begin to move. The system is now in "open loop." However, as the spring force is in the order of ten pounds or so, the pilot may overcome the system by applying pressure on the pedals. When this happens, the pilot applies force at a point 202 to sector 204 causing it to rotate about point 206, thus further compressing the spring 352 at point 208. Ultimately plate 211 will engage the slop eliminator piston 338 and point 208 will then be solidly restrained. The stops 170 and 172 on jack screw 166 are such that open loop cannot be maintained when the spring 352 is compressed. Accordingly, arm 228 closes the pilot valve 340. Thus the yaw system is actually a force limited "open loop," but may be considered a "feel autopilot" capable of exerting sufficient force to control the ship but which may be overcome by the pilot with a relatively small force.

The roll control mechanism illustrated in FIG. 14 consists of duplicate systems which are identical with that used for the pitch control shown diagrammatically in FIG. 13. In these duplicate mechanisms the pivot pins 102 are connected respectively with bosses 44c and 44b on the relatively stationary portion of the swash plate. These comprise the right and left lateral cyclic pitch control bosses as shown most clearly in FIG. 2. It will be understood that movement of the pin 102 either by the pilot or by the gyros will move the swash plate to provide lateral cyclic pitch control, the duplicate mechanisms connected to bosses 44c and 44b being differentially operated. The motors 144 are reversible motors and rotate in opposite directions for position signals. Thus movement of the stick to the left will lower boss 44b and raise boss 44c, while movement of the stick to the right will raise 44b and lower 44c. For altitude signal the motors 144 rotate in the same direction and are energized simultaneously with motor 144 of the pitch control system.

As previously stated, it is necessary to provide some means for controlling the reference level of any of the control systems above described. In the present autopilot system, the pilot is able to alter the reference setting to which the helicopter is slaved without disengaging the autopilot. In the pitch and roll systems which are straight differential systems, this change in reference setting is accomplished by a simple manipulation of the pilot's control. An additional nulling potentiometer 332 (FIG. 16) is provided capable of generating a voltage to offset any possible combination of steady state voltages introduced by the sum of the sensing elements 358. To eliminate additional pilot controls, this potentiometer is installed so as to allow it to be operated by the pilot's stick 26 when a clutch 234 is engaged by an actuating button 362 on the pilot's stick. It is then possible to adjust the sensitivity of this potentiometer at 374 so that any stick motion while the clutch 234 is engaged results in a displacement of the autopilot sub-servomotor exactly equal and opposite to the contribution to blade angle introduced by the straight mechanical linkage. Thus to null the autopilot in the center of its operating range the pilot has only to push the button 362 and move the stick until a null indicator provided on the instrument panel indicates the servo is centered. While doing this he does not disturb the steady state operation of the helicopter since the blade angle has not been changed. The autopilot displacement having been traded in effect for pilot's stick displacement with the clutch 234 disengaged, the voltage of potentiometer 332 is unchanged and remains as a bias on the rest of the system.

Figure 17:
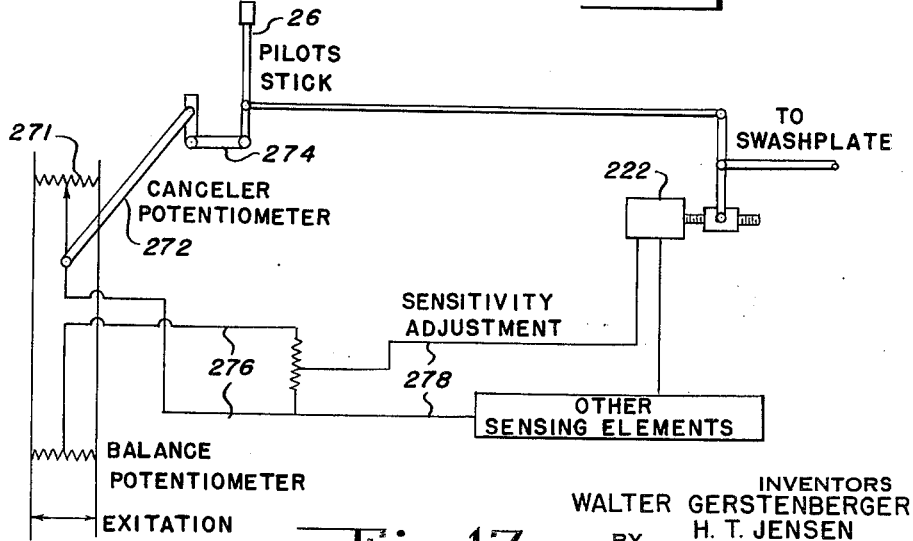
FIG. 17 is a diagrammatic view showing the stick canceler.

Referring to FIGS. 16 to 18, the stick 26 operates the potentiometer 332 when the clutch 234 is engaged by the button 362 on the pilot's stick. The stick 26 is also connected by a rod 364 to one end of a whiffletree 366 at pivot point 368. This whiffletree represents the mixing linkage shown in greater detail in FIGS. 13 and 14. The sub-servomotor 144, driving the usual jack screw 166, drives the nut which is pivotally connected at 142 to the other end of the whiffletree. The midpoint 370 of the whiffletree is pivotally connected by suitable linkage 372 to the non-rotating portion of the swash plate. Thus the differential action of the pilot's signal from the stick 26 and the autopilot's input is differentially applied. Motion of the pilot's stick 26 with clutch 234 engaged causes the potentiometer 332 to be unbalanced so as to impose a voltage on the autopilot sub-servomotor, and signal combination, whose magnitude in respect to the amount of stick motion is controlled by the sensitivity adjustment at 374. By proper control this voltage should be just sufficient for the resulting output of the sub-servomotor combination to offset the mechanical input at the other end of the whiffletree 366 so that the combined output of the differential system as applied to the controls is left unchanged.

While the systems described hereinbefore provide pilot feel during the partial range of travel in which the spring is engaged, a system which utilizes a full feel is shown in FIG. 15. While these systems are basically identical, here the spring 352 is immediately compressed upon moving the slop eliminator slide 211, and a follow-up potentiometer 380 is provided in the gyro circuit which is directly operated by the stick. Thus, when an error signal occurs while the stick is held stationary, the servo motor 222 introduces a correction limited by the follow-up transformer 181. Since this correction results in a proportional compression of the spring 352, a force proportional to the correction is felt in the stick 26. If the stick is allowed to move, the mechanical motion of the stick moves the follow-up potentiometer 380 until sufficient voltage is introduced to allow the motor to return to a position where the spring 352 is centered and no force is present in the stick because of the original error signal. With this arrangement it is possible to introduce corrections to the control surface with forces limited only by the capacity of the hydraulic power piston, at the same time limiting the forces which move the pilot's stick to an amount independent of the power piston and equal to the force output determined by the spring 352.

In FIGS. 23 and 24 the electrical diagrams of the pitch and yaw systems are shown. In these diagrams the numerals correspond to those used in the pitch and yaw systems shown in the mechanical and schematic views. The switches 385 shown leading from the compass circuit can be manually actuated switches, such as knife or micro switches, and they may be mounted in any convenient place, such as on the control panel or the actual rudder pedals so that when it is desired to change heading the compass is reconnected by closing the switches. This is obviously necessary in the yaw system where big changes in angles of heading up to one hundred eighty degrees may be desired.

It will be evident that as a result of this invention an autopilot has been provided which utilizes the primary hydraulic servo motors as the actuating members in the autopilot system. It will further be evident that an autopilot has been provided which utilizes the same controls for the autopilot as are normally used for the pilot's manual control by providing an electric sub-servomotor within the primary hydraulic power control to produce a differential control correction at the output power level of the servo for a differential autopilot system.

In addition, an automatic fail safe provision is made to lock out the autopilot differential input in the event of a failure of the primary hydraulic system. Also, in the open loop tail rotor control, means has been provided to utilize a low power sub-servomotor in the autopilot system to exert considerably amplified forces on the pilot's pedals, or the pilot's stick, to produce a stick free autopilot system which the pilot can overpower and manipulate the helicopter directly.

It will further be evident that improved canceler and nulling devices have been provided for an autopilot system whereby improved results are obtained in the control of the helicopter.

While one embodiment of the improved autopilot system has been shown by way of illustration, it will be understood that many changes in the construction and arrangement of the parts are contemplated within the scope of the invention.

We claim:
1. An aircraft having in combination, a rotor head having a blade mounted for pitch changing movement, a primary servomotor connected to said blade for changing the pitch of said blade, a pilot operative member for controlling said servomotor, a sub-servomotor for controlling said servomotor, aircraft attitude responsive means for controlling said sub-servomotor, and means for differentially applying the control forces from said pilot operative member and said sub-servomotor to said primary servomotor.

2. In an aircraft in combination, a movable surface for controlling an aircraft, a servomotor connected to said surface for moving said surface, valve means for actuating said servomotor, a pilot operative member, reference means on the aircraft to be controlled for producing a signal in response to a departure from a predetermined position of said aircraft, a sub-servomotor actuated by said signal, first means operatively connecting said pilot operative member and said sub-servomotor to said valve means whereby either said member or said sub-servomotor or both together may move said valve means, and second means also connecting said pilot operative member to said surface for direct movement of said surface by said pilot operative member, said last named second means including a device for disabling said second connecting means so that said pilot operative member moves said valve means without directly moving said surface.

3. In an aircraft in combination, a movable surface for controlling an aircraft, means for actuating said surface, a servomotor connected to said actuating means for moving said surface, valve means for actuating said servomotor, a pilot operative member, reference means on the aircraft to be controlled for producing a signal in response to a departure from a predetermined position of said aircraft, a sub-servomotor actuated by said signal, first means operatively connecting said pilot operative member and said sub-servomotor to said valve means whereby either said member or said sub-servomotor or both together may move said valve means, and second means also connecting said pilot operative member to said actuating means for direct movement of said means by said pilot operative member, said last named second means including a device for disabling said second connecting means so that said pilot operative member moves said valve means without directly moving said actuating means.

4. In an aircraft in combination, a movable surface for controlling an aircraft, means for actuating said surface, a servomotor connected to said actuating means for moving said surface, first valve means for actuating said servomotor, a pilot operative member, reference means on the aircraft to be controlled for producing a signal in response to a departure from a predetermined position of said aircraft, a sub-servomotor actuated by said signal, first means operatively connecting said pilot operative member and said sub-servomotor to said first valve means whereby either said member or said sub-servomotor or both together may move said first valve means, and second means also connecting said pilot operative member to said actuating means for direct movement of said means by said pilot operative member, said second connecting means including second valve means providing for free movement of said servomotor, said second connecting means including a device for disabling said second connecting means so that said pilot operative member moves said first valve means without directly moving said actuating means.

13

5. In an aircraft in combination, a movable surface for controlling an aircraft, means for actuating said surface, a servomotor connected to said actuating means for moving said surface, first valve means for actuating said servomotor, a pilot operative member, reference means on the aircraft to be controlled for producing a signal in response to a departure from a predetermined position of said aircraft, a sub-servomotor actuated by said signal, first means operatively connecting said pilot operative member and said sub-servomotor to said first valve means whereby either said member or said sub-servomotor or both together may move said first valve means, and second means also connecting said pilot operative member to said actuating means for direct movement of said means by said pilot operative member, said second connecting means including second valve means providing for free movement of said servomotor, said second connecting means including a device for disabling said second connecting means so that said pilot operative member moves said first valve means without directly moving said actuating means, said disabling device being connected to said second valve means so that when said second connecting means is disabled said servomotor is not provided free movement by said second valve means.

6. A helicopter having in combination, variable pitch blades and control means connected with said blades for controlling the pitch of the latter, a hydraulic servomotor operatively connected to said control means for changing the pitch of said blades, said servomotor having a pilot valve for admitting hydraulic fluid thereto, a pilot operative member, lost motion connection means connecting said member with said control means, means on the helicopter for generating a signal in response to a departure from a predetermined position of said helicopter, a sub-servomotor actuated by said signal, and a differential linkage operatively connected with said pilot valve and with both said sub-servomotor and said pilot operative member for controlling said servomotor in response to either or both the movement of said generating means or the movement of said pilot operative member permitted by said lost motion connection, and means for preventing the lost motion in said connection means enabling said member to move said control means directly.

7. In an aircraft in combination, a movable surface for controlling an aircraft, means for actuating said surface, a servomotor connected to said actuating means for moving said surface, first valve means for actuating said servomotor, a pilot operative member, reference means on the aircraft to be controlled for producing a signal in response to a departure from a predetermined position of said aircraft, a sub-servomotor actuated by said signal, means operatively connecting said pilot operative member and said sub-servomotor to said first valve means whereby either said member or said sub-servomotor or both together may move said first valve means, means connecting said pilot operative member to said surface to be maintained inoperative during operation of said surface by said servomotor, and means for making said last named connecting means operative to move said surface by said pilot operative member independently of a driving action by the servomotor.

8. A helicopter having in combination, variable pitch blades and control means connected with said blades for controlling the pitch of the latter, a hydraulic servomotor operatively connected to said control means, said servomotor having a valve for admitting hydraulic fluid thereto, a pilot operative member for moving said valve, means on the helicopter for generating a signal in response to a departure from a predetermined position of said helicopter, a sub-servomotor actuated by said signal, a differential linkage operatively connected directly with said valve and with both said sub-servomotor and said pilot operative member for controlling said servomotor, and means operatively connecting said pilot operative

14 member with said control means for moving said blade independently of said valve.

9. A helicopter having in combination, variable pitch blades and control means connected with said blades for controlling the pitch of the latter, a hydraulic servomotor operatively connected to said control means for changing the pitch of said blades, said servomotor having valve means for admitting hydraulic fluid thereto, a pilot operative member for moving said valve means, lost motion connection means connecting said pilot operative member with said control means enabling said member to move said valve means through an initial movement of said member without moving said control means directly, means on the helicopter for generating a signal in response to a departure from a predetermined position of said helicopter, a sub-servomotor actuated by said signal, a differential linkage operatively connected with said valve means and with both said sub-servomotor and said pilot operative member for controlling said servomotor in response to operation of either or both of said pilot operative member and said generating means, and a source of hydraulic fluid under pressure, said lost motion connection means having means for eliminating said lost motion in the connection between said pilot operative member and said control means so that said pilot operative member can move said control means directly.

10. A helicopter having in combination, variable pitch blades and control means connected with said blades for controlling the pitch of the latter, a hydraulic servomotor operatively connected to said control means for changing the pitch of said blades, said servomotor having valve means for admitting hydraulic fluid thereto, a pilot operative member for moving said valve means, lost motion connection means connecting said pilot operative member with said control means enabling said member to move said valve means through an initial movement of said member without moving said control means directly, means on the helicopter for generating a signal in response to a departure from a predetermined position of said helicopter, a sub-servomotor actuated by said signal, a differential linkage operatively connected with said valve means and with both said sub-servomotor and said pilot operative member for controlling said servomotor in response to operation of either or both of said pilot operative member and said generating means, and a source of hydraulic fluid under pressure, said lost motion connection means having means for eliminating said lost motion in the connection between said pilot operative member and said control means including cam means movable into a position to eliminate said lost motion whereby said pilot operative member can move said control means directly.

11. A helicopter having in combination, variable pitch blades and control means connected with said blades for controlling the pitch of the latter, a hydraulic servomotor operatively connected to said control means for changing the pitch of said blades including a cylinder having a piston therein, said piston forming chambers on opposite sides thereof with said cylinder, said servomotor having first valve means for admitting hydraulic fluid thereto, a pilot operative member for moving said first valve means, lost motion connection means connecting said pilot operative member with said control means enabling said member to move said first valve means through an initial movement of said member without moving said control means directly, means on the helicopter for generating a signal in response to a departure from a predetermined position of said helicopter, a sub-servomotor actuated by said signal, a differential linkage operatively connected with said first valve means and with both said sub-servomotor and said pilot operative member for controlling said servomotor in response to operation of either or both of said pilot operative member and said signal generating means, and a source of hydraulic fluid under pressure, said lost motion connection means having means for eliminating said lost motion in the connection between said pilot operative member and said control means so that said pilot operative member can move said control means directly and second valve means for connecting the chambers on opposite sides of said piston of said servomotor when said lost motion has been eliminated.

12. In an aircraft in combination, a movable surface for controlling an aircraft, primary hydraulic servomotor means for moving said surface including a pilot valve, pilot operative means for controlling said pilot valve, gyroscopic means for controlling said pilot valve, and differential mechanism operatively connected with both of said pilot operative means and gyroscopic means and with said pilot valve for operating the latter upon operation of either or both of said means to energize said servomotor means, said pilot operative means also having means operatively connecting it with said surface for moving said surface independently of said pilot valve.

13. In an aircraft in combination, a movable surface for controlling an aircraft, a primary servomotor operatively connected to said surface for moving said surface, valve means operatively connected with said primary servomotor for actuating said primary servomotor, a differential actuating link, a pilot operative member for operating said valve means being connected to said link adjacent one end of said link, said pilot operative member also having a lost motion connection with said movable surface for operating the surface directly, a sub-servomotor for operating said valve means being connected to said link, said link being operatively connected to said valve means for actuating said valve means, and means for generating a signal in response to a departure from a predetermined position of said aircraft, said sub-servomotor being responsive to said signal.

14. In an aircraft in combination, a movable surface for controlling an aircraft, a servomotor having cylinder and piston units, said servomotor being operatively connected to said surface for moving said surface, first valve means operatively connected with said servomotor for actuating said servomotor, a differential actuating link, said link being operatively connected to said first valve means for actuating said first valve means, a pilot operative member for operating said first valve means being connected to said link, a sub-servomotor for operating said first valve means being connected to said link, and means for generating a signal in response to a departure from a predetermined position of said aircraft, said sub-servomotor being responsive to said signal, said pilot operative member also having means operatively connecting it with said surface for moving said surface independently of said first valve means, said connecting means including second valve means for connecting one end of said cylinder unit to the other to provide a passageway therebetween, said connecting means being rendered inoperative by a device which directs movement of said pilot operative member to move said first valve means.

15. A helicopter having in combination, a rotor having blades mounted for pitch changing movements, means for controlling the pitch of said blades cyclically including rotatable and non-rotatable swash plate members, a pilot opearitve control member, hydraulic servomotor mechanism providing power operation of said blade pitch control means including a servomotor having a cylinder and piston elements, one of which is connected to fixed structure of the helicopter and the other of which has an operative connection to said non-rotatable swash plate, a source of hydraulic fluid under pressure, a pilot valve for metering fluid to opposite sides of said piston having an operative connection to said pilot operative control member, lost motion means connecting said pilot operative member and said non-rotatable swash plate member permitting an initial movement of said pilot operative control member and said pilot valve free from said pitch control means sufficient to meter fluid to said servomotor, and means for controlling said pilot valve independently of the control thereof by said pilot operative member including a sub-servomotor operatively connected with said pilot valve and a position responsive device on the helicopter for generating a signal to energize said sub-servomotor in response to a departure from a predetermined position of said helicopter.

16. A combination as claimed in claim 15 in which said lost motion means includes means providing a direct connection between said pilot operative member and said non-rotatable swash plate member and for establishing fluid communication between opposite sides of said servomotor piston in response to failure of hydraulic pressure in said source.

17. In an aircraft in combination, a movable surface for controlling an aircraft, a primary servomotor for moving said surface, valve means for actuating said primary servomotor, a pilot operative member for operating said valve means, a sub-servomotor for operating said valve means, means for generating a signal in response to a departure from a predetermined position of said aircraft, said sub-servomotor being responsive to said signal, and differential operating means operatively connecting said pilot operative member and said sub-servomotor to said valve means, said pilot operative member being also connected to said movable surface through another connection for directly controlling said surface.

18. In combination in a helicopter of the type having a main sustaining rotor with variable pitch blades, a pilot operative member having control means for varying the pitch of said rotor blades to control said helicopter including a primary servo and a pilot valve for admitting hydraulic fluid to operate said servo, a sub-servomotor also operatively connected with said control means to operate said pilot valve, gyro means for energizing said sub-servomotor in response to a movement of said helicopter, a lost motion connection between said member and said control means for permitting an initial movement of said valve by said member to admit hydraulic fluid to said primary servomotor, a source of pressure fluid, and means to limit the movement of said lost motion connection upon large movements of said control means by said sub-servomotor.

19. An aircraft having in combination, a movable surface operably connected to said aircraft for controlling an aircraft, a primary servomotor operably connected to said surface for moving said surface, a pilot operative member for controlling said servomotor, a sub-servomotor for controling said servomotor, a position responsive gyro operably connected to said sub-servomotor for energizing said sub-servomotor, means operably connected to said pilot operative member, said sub-servomotor, and said primary servomotor for differentially applying the control forces from said pilot operative member and said sub-servomotor to said primary servomotor, and means operably connected to said pilot operative member enabling the pilot to override said gyro energizing force to alter the reference heading of the aircraft including means for opposing the gyro signal during movement of said pilot operative member.

20. An aircraft having in combination, a movable surface for controlling an aircraft, a primary servomotor for moving said surface, a pilot operative member for controlling said servo motor, a sub-servomotor, a position responsive gyro for energizing said sub-servomotor, and means for differentially applying the control forces from said pilot operative member and said sub-servomotor to said surface, and a potentiometer connected to said pilot operative member capable of generating a voltage to offset any voltage introduced by said gyro due to movement of said pilot operative member.

21. An aircraft having in an operative combination, a movable surface for controlling an aircraft, a primary servomotor for moving said surface, a pilot operative member for controlling said servomotor, a sub-servomotor for controlling said servomotor, a position responsive gyro for energizing said sub-servomotor, means for differentially applying the control forces from said pilot operative member and said sub-servomotor to said surface, a nulling potentiometer capable of generating a signal to offset any signal introduced by said gyro due to movement of said pilot operative member, and a pilot operable clutch for operatively connecting said potentiometer to said member.

22. In an aircraft in an operable combination, a movable surface for controlling said aircraft, a primary servomotor connected to said movable surface for moving it, a pilot valve for controlling said servomotor, a pilot operative member for manually controlling said pilot valve, reference means on the aircraft to be controlled for generating a signal in response to a departure from a predetermined position of said aircraft, a sub-servomotor actuated by said reference means, and differential means operatively connecting said member and said sub-servomotor to said pilot valve whereby either said member or said sub-servomotor or both together may move said blade.

23. In an aircraft in combination, a movable surface for controlling an aircraft, a primary servomotor operatively connected to said surface for moving said surface, valve means operatively connected with said primary servomotor for actuating said primary servomotor, a pilot operative member for operating said valve means, a sub-servomotor for operating said valve means, gyro means for generating a signal in response to a departure from a predetermined position of said aircraft, said sub-servomotor being responsive to said signal, differential operating means operatively connecting said pilot operative member and said sub-servomotor to said valve means, and means connected to said pilot operative member for offsetting a gyro means signal to prevent a bucking effect when the pilot operative member is moved.

24. In an aircraft in combination, a movable surface for controlling an aircraft, a primary servomotor for moving said surface, valve means for actuating said primary servomotor, a pilot operative member for operating said valve means, a sub-servomotor for operating said valve means, gyro means for generating a signal in response to a departure from a predetermined position of said aircraft, said sub-servomotor being responsive to said signal, differential operating means operatively connecting said pilot operative member and said sub-servomotor to said valve means, and a follow-up transformer, said transformer being connected to said sub-servomotor for operation therewith, said transformer putting out a signal in response to movement by said sub-servomotor to offset the signal of said gyro means.

25. In an aircraft in combination, a movable surface for controlling an aircraft, a primary servomotor for moving said surface, valve means for actuating said primary servomotor, a pilot operative member for operating said valve means, a sub-servomotor for operating said valve means, gyro means for generating a signal in response to a departure from a predetermined position of said aircraft, said sub-servomotor being responsive to said signal, differential operating means operatively connecting said pilot operative member and said sub-servomotor to said valve means, and a rate generator, said generator being connected to said sub-servomotor for operation therewith, said rate generator creating a bucking voltage to damp the movement of said sub-servomotor.

26. In an aircraft in combination, a surface to be controlled, a source of hydraulic fluid, a primary hydraulic servo motor operatively connected with said surface, a pilot valve controlling admission of fluid from said source to said servomotor, a pilot operative member operatively connected with said pilot valve, gyro means on said aircraft for generating a signal in response to a departure of said aircraft from a predetermined position, a sub-servomotor energized by said signal having an operative connection to said pilot valve, a normally centered resilient member having an operative connection with said pilot operative member and with said sub-servomotor, and a follow-up means operatively connected with said pilot operative member for introducing a signal sufficient upon movement of said pilot operative member to allow said sub-servomotor to return to its original position in which said resilient means is centered.

27. In an aircraft in combination, a surface to be controlled, a source of hydraulic fluid, a primary servomotor operatively connected with said surface, a pilot valve controlling admission of fluid from said source to said servomotor, a pilot operative member operatively connected with said pilot valve, a control circuit including gyro means on said aircraft for generating a signal in said circuit in response to a departure of said aircraft from a predetermined position, a sub-servomotor in said circuit energized by said signal having an operative connection to said pilot valve, a normally centered resilient member carried by fixed structure of said aircraft, a movable element for flexing said resilient member in opposite directions which is operatively connected to said pilot operative member and to said sub-servomotor, and means for introducing corrections to said control surface with forces limited only by the capacity of said primary servomotor while limiting the forces applied to said pilot operative member to a force equal to the force of said resilient member including a follow-up in said circuit which is operated by said pilot operative member.

28. In an aircraft in combination, variable pitch blades for controlling an aircraft, means connected with said blades for varying the pitch of said blades, a primary servomotor operatively connected to said means for actuation thereof, valve means operatively connected to said primary servomotor for actuating said primary servomotor, a pilot operative member for operating said valve means, a sub-servomotor for operating said valve means, means for generating a signal in response to a departure from a predetermined position of said aircraft, said sub-servomotor being responsive to said signal, and differential operating means operatively connecting said pilot operative member and said sub-servomotor to said valve means.

29. A helicopter in combination, variable pitch blades and control mechanism including a swash plate connected with said blades for controlling the pitch of the latter, a source of hydraulic fluid under pressure, a primary hydraulic servomotor operatively connected to said swash plate for tilting the latter, said servomotor having a pilot valve for admitting fluid from said source, a pilot operative member operatively connected to said valve, said member also having a lost motion connection with said swash plate permitting an initial movement of said member to move said valve and control said swash plate by said servomotor, gyro means on said helicopter for generating a signal in response to a departure from a predetermined position of said helicopter, a sub-servomotor energized by said signal having operative connections to said valve, and means to limit the movement of said lost motion connection upon large movement of said control means.

30. A helicopter in combination, variable pitch blades and control mechanism including a swash plate connected with said blades for controlling the pitch of the latter, a source of hydraulic fluid under pressure, a primary hydraulic servomotor operatively connected to said swash plate for tilting the latter, said servomotor having a pilot valve for admitting fluid from said source, a pilot operative member operatively connected to said valve, said member also having a lost motion connection with said swash plate permitting an initial movement of said member to move said valve and control said swash plate by said servomotor, gyro means on said helicopter for generating a signal in response to a departure from a predetermined position of said helicopter, a sub-servomotor energized by said signal having operative connections to said valve, and means for exerting a force to resist movement of said member which is proportional to the displacement of said member by the pilot.

31. A helicopter having in combination, a main sustaining rotor and an anti-torque tail rotor equipped with variable pitch blades, a pilot operative member having control means for varying the pitch of said tail rotor to control said helicopter in yaw including a primary servo and a pilot valve for admitting hydraulic fluid to operate said servo, a sub-servomotor also operatively connected with said pilot valve, gyro means for controlling the energization of said sub-servomotor in response to a yawing movement of said helicopter, a lost motion connection between said member and said pitch control means for permitting an initial movement of said valve by said member to admit hydraulic fluid to said primary servomotor, a source of pressure fluid, a slop eliminator for eliminating the lost motion in said connection having means constantly biasing it into operative position and a pressure responsive member acted on by the pressure from said source for holding it inoperative against its bias, and means for introducing feel into said pilot controls including resilient means between said pilot operative member and said pitch control means for opposing movement of said pilot operative member by said primary servomotor whereby a proportional force is transmitted to said pilot operative member upon movement of said primary servomotor.

32. A helicopter having in combination, a fuselage, a rotor head rotatably mounted with respect to said fuselage having blades mounted thereon for pitch changing movement, first means connected to said blades for varying the pitch of said blades, a servomotor operatively connected to said fuselage and said first means for actuation thereof, valve means operatively connected to said primary servomotor for actuating said primary servomotor, a pilot operative member for operating said valve means, a sub-servomotor for operating said valve means, a reference means on said fuselage for generating a signal in response to a departure from a predetermined position of said fuselage, said sub-servomotor being operatively connected to said reference means so that it is responsive to signals put out by said reference means, and differential means operatively connecting said pilot operative member and said sub-servomotor to said valve means whereby either said pilot operative member or said sub-servomotor or both together may move said blades.

References Cited in the file of this patent

UNITED STATES PATENTS

| | | |
|---|---|---|
| 1,142,218 | Wood | June 8, 1915 |
| 2,272,725 | Overbeke | Feb. 10, 1942 |
| 2,443,192 | Moeller | June 15, 1948 |
| 2,464,629 | Young | Mar. 15, 1949 |
| 2,479,549 | Ayres | Aug. 23, 1949 |
| 2,487,116 | Eaton | Nov. 8, 1949 |
| 2,550,538 | Doman | Apr. 24, 1951 |
| 2,616,264 | Grant | Nov. 4, 1952 |
| 2,646,947 | Kutzler et al. | July 28, 1953 |
| 2,650,046 | Vanderlip | Oct. 25, 1953 |
| 2,672,307 | Cook | Mar. 16, 1954 |